United States Patent
Morrow et al.

(10) Patent No.: US 6,764,786 B2
(45) Date of Patent: Jul. 20, 2004

(54) FUEL CELL STACK HAVING AN IMPROVED PRESSURE PLATE AND CURRENT COLLECTOR

(75) Inventors: Aaron W. Morrow, East Longmeadow, MA (US); Grant M. Erlich, West Hartford, CT (US); Javier Resto, Jacksonville, FL (US)

(73) Assignee: UTC Fuel Cells, LLC, South Windsor, CT (US)

( * ) Notice: Subject to any disclaimer, the term of this patent is extended or adjusted under 35 U.S.C. 154(b) by 90 days.

(21) Appl. No.: 10/141,612

(22) Filed: May 8, 2002

(65) Prior Publication Data

US 2003/0211379 A1 Nov. 13, 2003

(51) Int. Cl.$^7$ .......................... H01M 2/08; H01M 2/14; H01M 2/00; H01M 2/02
(52) U.S. Cl. .............................. 429/37; 429/34; 429/39
(58) Field of Search .............................. 429/34, 37, 39

(56) References Cited

U.S. PATENT DOCUMENTS

| | | | |
|---|---|---|---|
| 3,881,956 A | * | 5/1975 | Williams ..................... 429/12 |
| 4,728,585 A | | 3/1988 | Briggs |
| 5,009,968 A | | 4/1991 | Guthrie et al. |
| 5,219,673 A | * | 6/1993 | Kaun .......................... 429/32 |
| 5,484,666 A | | 1/1996 | Gibb et al. |
| 5,750,278 A | * | 5/1998 | Gillett et al. ................ 429/24 |
| 6,001,502 A | | 12/1999 | Walsh |
| 6,048,635 A | | 4/2000 | Guthrie |

\* cited by examiner

*Primary Examiner*—Patrick Ryan
*Assistant Examiner*—Julian Mercado
(74) *Attorney, Agent, or Firm*—Malcolm J. Chisholm, Jr.

(57) ABSTRACT

The invention is a fuel cell stack having an improved pressure plate and current collector. The fuel cell stack includes a plurality of fuel cell component plates stacked adjacent each other to form a reaction portion of the fuel cell stack. A current collector is secured adjacent a first end of the stack of fuel cell component plates and a pressure plate is secured adjacent to the current collector. The current collector is made from a non-porous, electrically conductive graphite material and includes at least one conductive stud secured to the collector. The pressure plate is made of an electrically non-conductive, non-metallic, fiber reinforced composite material, so that the current collector and pressure plate are light, compact and have a low thermal capacity.

13 Claims, 5 Drawing Sheets

FUEL CELL STACK HAVING AN IMPROVED PRESSURE PLATE AND CURRENT COLLECTOR

TECHNICAL FIELD

The present invention relates to fuel cells arranged in fuel cell stack assemblies that are suited for usage in transportation vehicles, portable power plants, or as stationary power plants. In particular the invention relates to a fuel cell stack having a light, electrically insulating pressure plate and a compact current collector, both of which have a low thermal capacity.

BACKGROUND OF THE INVENTION

Fuel cells are well-known and are commonly used to produce electrical energy from reducing and oxidizing reactants fluids to power electrical apparatus such as apparatus on-board space vehicles, transportation vehicles, or as on-site generators for buildings. A plurality of planar fuel cell plate components are typically arranged into a cell stack surrounded by an electrically insulating frame structure that defines manifolds for directing flow of reducing, oxidant, coolant and product fluids as part of a fuel cell power plant. Each individual fuel cell generally includes an anode electrode and a cathode electrode separated by an electrolyte. A reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a catalyst surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy. The fuel cell plate components also frequently include a plurality of coolant plates dispersed between the fuel cells. Coolant fluid typically cycles through the coolant plates to maintain the fuel cells and fuel cell stack at an optimum temperature.

It is well known to utilize thick current collecting plates at opposed ends of the cell stack in electrical contact with end plates of the stack in order to collect electrical current generated by the fuel cells of the stack, and to direct the current through cables from the current collectors to a load to perform work. It is also known to utilize thick metal pressure plates at opposed ends of the cell stack, wherein the pressure plates typically include a fastening assembly such as a plurality of tie rods extending between the pressure plates that serve to apply a compressive force on the current collectors and fuel cell plate components between the pressure plates.

For example, in U.S. Pat. No. 4,728,585 that issued on Mar. 1, 1988, to Briggs, which patent is owned by the assignee of all rights in the present invention and which patent is hereby incorporated herein by reference, a steel pressure plate with an adjacent thin, porous graphite plate impregnated with PTFE are shown replacing a thick collector plate and an overhanging, steel pressure plate. The thin, PTFE impregnated graphite plate provides an electrically conductive gas seal between the steel pressure plate and the end plate of the fuel cell component plates, so that the steel pressure plate may also serve as a current collector. U.S. Pat. No. 5,009,968 that issued on Apr. 23, 1991 to Guthrie et al. and to the assignee of all rights in the present invention also shows a fuel cell end plate structure that includes a membrane that is sufficiently thin that compressive forces applied through the membrane and adjacent cells by opposed pressure pads will maintain the membrane in intimate electrical contact with electrodes at multiple locations.

U.S. Pat. No. 6,001,502 that issued on Dec. 14, 1999 to Walsh, also shows combined structural pressure or end plates and current collectors as "conductive bodies", wherein select surface areas of the conductive bodies are treated with an electrical conductivity "isolating material" to permit electrical conduction from the fuel cells into the conductive body, and to insulate fastening structures contacting the bodies and fluid headers defined within the bodies.

It is also well known that for steel or aluminum combined pressure plate/current collectors, the plates of stainless steel or aluminum are often plated with a precious metal such as gold at substantial cost. The gold plating serves to minimize contact resistance because both aluminum and stainless steel develop non-conductive oxide surfaces when exposed to air and water or water vapor in a typical PEM fuel cell operating environment. It has been shown, however, that such gold plating is both costly and unreliable due to poor adhesion between the gold and base metal.

Known fuel cell stack pressure plates and current collectors are thus typically bulky, complex devices that are costly to manufacture, and that also contribute a substantial weight and volume penalty to overall fuel cell stack specifications. While fuel cell stacks utilized in stationery power plants may operate acceptably with known pressure plates and current collectors, fuel cell stacks utilized to power transportation vehicles must minimize the weight, volume and cost of the fuel cell stack. Additionally, fuel cell stacks utilized within transportation vehicles must be able to start quickly in sub-freezing conditions. Known, heavy, dense metallic pressure plates and/or current collectors exhibit very high thermal mass or thermal capacities. Therefore, they absorb a great deal of thermal energy during a cold start, effectively extending the start-up period. Such high thermal capacity plates also create a thermal lag during a cold start between the fuel cells adjacent to the pressure plates and those fuel cells within the interior of the cell stack. Such a thermal lag prevents rapid start of the fuel cell, which is undesirable.

Accordingly, there is a need for a fuel cell stack having pressure plates and current collectors that are light, less costly to manufacture, and that have substantially reduced thermal capacities.

DISCLOSURE OF THE INVENTION

The invention is a fuel cell stack having an improved pressure plate and current collector. The fuel cell stack produces electricity from reducing fluid and process oxidant reactant streams, and comprises a plurality of fuel cell component plates stacked adjacent each other to form a reaction portion of the fuel cell stack. The plurality of fuel cell component plates include a first end cell component plate at a first end of the stack of fuel cell component plates, and a second end cell component plate at an opposed second end of the stack of fuel cell component plates. A current collector is secured adjacent to an end cell component plate. In one embodiment, the current collector is made from a non-porous, electrically conductive graphite material. In an alternative embodiment the current collector may consist of a thin conductive metal layer (such as a 2 millimeter ("mm") thick copper layer) secured to an electrically conductive graphite material layer so that the graphite material layer is secured adjacent the end cell component plate. The "electrically conductive graphite material" may consist of a pure graphite or a graphite-polymer composite. The current collector also includes at least one conductive stud secured to the collector and extending away from the current collector in a direction away from the end cell component plate. The fuel cell stack also includes a pressure plate secured adjacent to the current collector, wherein the pressure plate overlies the end cell component plate adjacent to the current collector, and the pressure plate is made of an electrically non-conductive, nonmetallic, fiber reinforced composite material.

In a preferred embodiment, the fuel cell stack also includes a thermal insulator secured between the current collector and the pressure plate, for restricting movement of heat from the current collector to the pressure plate and to the surrounding environment. In an additional preferred embodiment, the conductive stud of the current collector may pass through an opening defined within the pressure plate. The current collector may also include a pair or more of conductive studs passing through the pressure plate. The fuel cell stack may also include a first current collector secured adjacent the first end cell component plate and a first pressure plate secured adjacent the first current collector, while a second current collector and second pressure plate are secured in similar fashion adjacent the second end cell component plate and the first and second current collector are both made from a non-porous, conductive graphite material, and the first and second pressure plates are both made of a nonconductive, non-metallic, fiber reinforced composite material.

Accordingly, it is a general object of the present invention to provide a fuel cell stack having an improved pressure plate and current collector that overcome deficiencies of prior art fuel cell stacks.

It is a more specific object to provide a fuel cell stack having an improved pressure plate and current collector that exhibit less weight, volume, and thermal capacity than known fuel cell stack pressure plates and current collectors.

It is yet another object to provide a fuel cell stack having an improved pressure plate and current collector that may be manufactured with greater facility and at a substantially lower cost than known fuel cell stack pressure plates and current collectors.

It is a further object to provide a fuel cell stack having an improved pressure plate and current collector that virtually eliminate corrosion problems associated with known fuel cell stack pressure plates and current collectors.

It an additional object to provide a fuel cell stack having an improved pressure plate and current collector that is safer than known fuel cell stacks having metallic pressure plates because the improved pressure plate of the present invention includes no electrically conductive material exposed to an outside environment surrounding the fuel cell stack.

It is yet a further object to provide a fuel cell stack having an improved pressure plate and current collector wherein non-conductive pressure plates eliminate a need for electrically isolating tie rods passing through the pressure plates, which tie rods apply a compressive load to the plates, thereby reducing cost, simplifying design of the fuel cell stack, and reducing construction and assembly time of parts of the fuel cell stack.

These and other objects and advantages of this invention will become more readily apparent when the following description is read in conjunction with the accompanying drawings.

DESCRIPTION OF THE PREFERRED EMBODIMENTS

Figure 1:
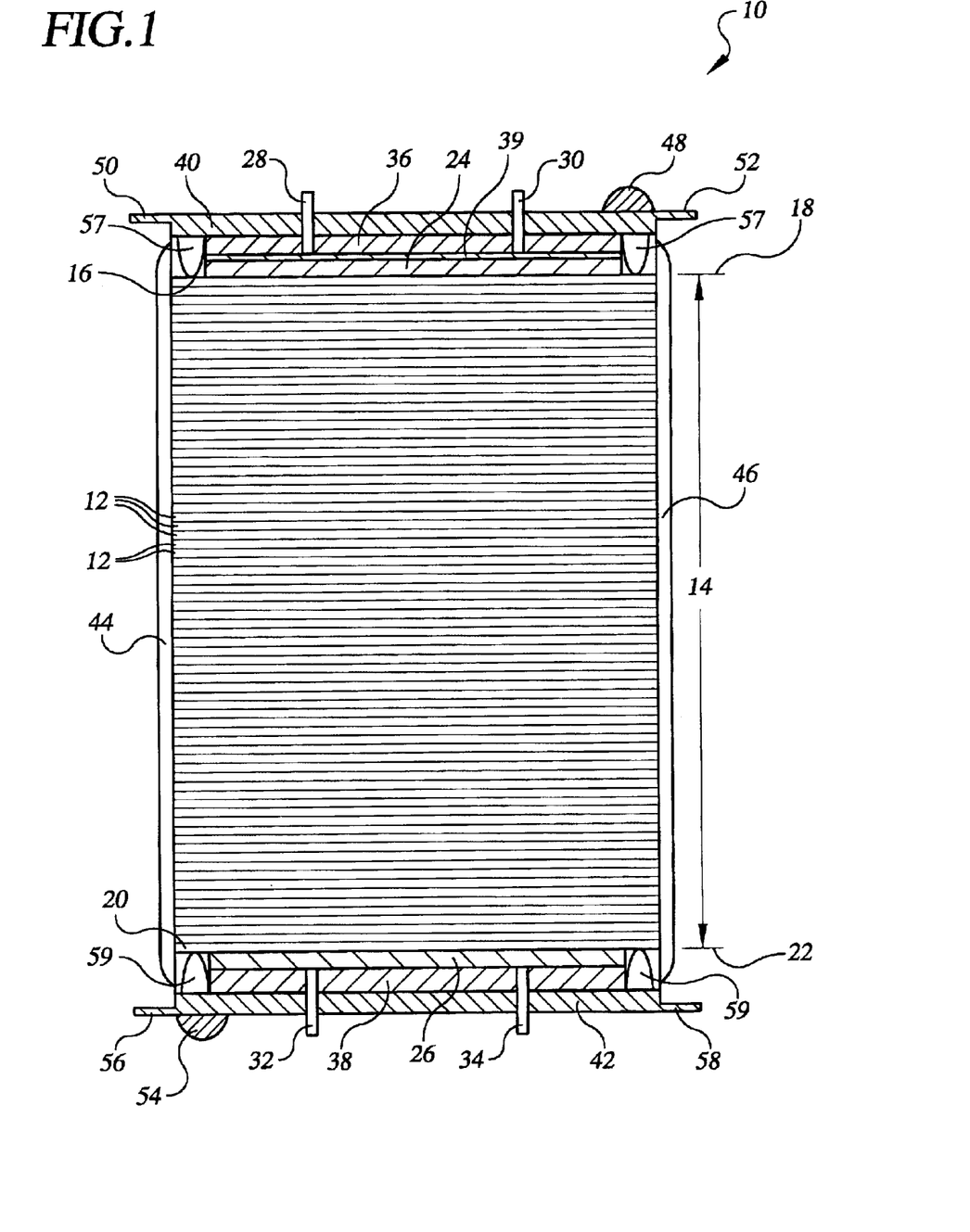
FIG. 1 is a cross-sectional, schematic representation of a fuel cell stack having an improved pressure plate and current collector constructed in accordance with the present invention.
Figure 2:
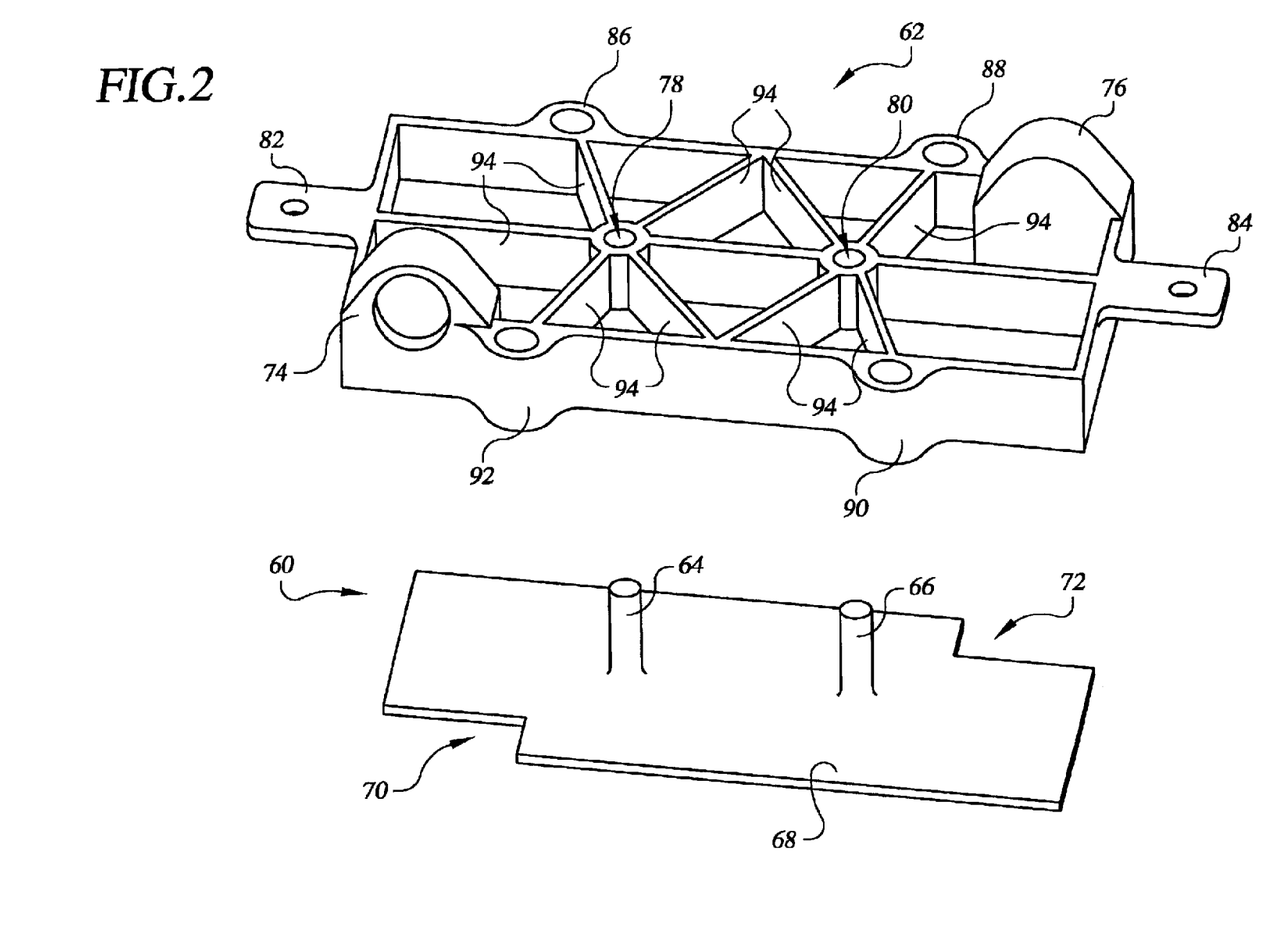
FIG. 2 is top perspective view of an exemplary improved pressure plate and current collector.

Referring to the drawings in detail, FIG. 1 shows a schematic, cross-sectional representation of a fuel cell stack constructed in accordance with the present invention, and generally represented by the reference numeral 10. As best shown in FIG. 1, the fuel cell stack 10 includes a plurality of fuel cell component plates 12 that define a reaction portion 14 of the fuel cell stack 10. As is well known in the art, the fuel cell component plates 12 of the stack 10 include plate-shaped components making up individual fuel cells, such as anode and cathode electrodes on opposed sides of electrolytes, such as PEM electrolytes, along with coolant plates disposed between some fuel cells to maintain an optimal temperature of the fuel cells and fuel cell stack 10, such as fuel cell plate components disclosed for example in the aforesaid, incorporated U.S. Pat. No. 4,728,585, as well as a fuel cell stack disclosed in U.S. Pat. No. 6,331,366 that issued to Van Dine et al. on Dec. 18, 2001, and which patent is owned by the assignee of all rights in the present invention and which patent is hereby incorporated herein by reference. A first end cell component plate 16 is secured at a first end 18 of the reaction portion 14 of the fuel cell stack 10, and a second end cell component plate 20 is secured at a second end 22 of the reaction portion 14, which second end 22 is opposed to the first end 18 of the reaction portion 14 of the fuel cell stack 10.

A first current collector 24 is secured adjacent to the first end cell component plate 16 so that the first current collector is in electrical communication with the first end cell component plate 16. A second current collector 26 is secured adjacent to the second end cell component plate 20, so that the second current collector 26 is in communication with the second end cell component plate 20. The first and second current collectors 24, 26 are made from non-porous, electrically conductive graphite, or from an electrically conductive graphite-polymer composite (referred to collectively herein as "an electrically conductive graphite material"). An exemplary electrically conductive graphite material is available under the trade name "PEMTEX GRADE", manufactured by the Quantum Composites Co., of Bay City, Mich., U.S.A. In a preferred embodiment of the first or second current collectors 24, 26, the non-porous graphite material may have a preferred thickness of 3–12 mm, and a preferred conductivity of 25 siemens per centimeter, or greater.

Additionally, the first and second current collectors 24, 26 may be dimensioned so that cross-sectional areas of the first and second current collectors 24, 26 are at least as large as cross-sectional areas of the adjacent first and second end cell component plates 16, 20 in order to enhance conduction of electricity between the end cell component plates 16, 20 and the current collectors 24, 26. The first current collector 24 also includes a first conductive stud 28 and a second conductive stud 30 secured to the collector 24. Similarly, the second current collector 26 includes a third conductive stud 32 and fourth conductive stud 34. The conductive studs 28, 30, 32, 34 extend in a direction away from the first or second current collector 24, 26 to which they are secured and also in a direction away from the first end cell component plate 16 or second end cell component plate 20 to which the first or second current collector 24, 26 is secured. The conductive studs 28, 30, 32, 34 may be made of any material with acceptable electrical conductivity, such as copper, nickel, stainless steel, or graphite, etc., and the conductive studs may be mechanically connected to the current collectors 24, 25 by thread, or may be welded, brazed, or joined by a conductive adhesive to the current collectors 24, 25. The conductive studs 28, 30, 32, 34 may also be formed of any conductive cable or lead, known in the art for conducting electricity from a fuel cell stack 10 to a load for performing work. It is also to be understood that the scope of the present invention includes the first current collector 24 having one or more conductive studs, as well as the second current collector 26 having one or more conductive studs.

The fuel cell stack 10 may also include a first thermal insulator 36 secured adjacent the first current collector 24 and positioned so that the first current collector 24 is between the first thermal insulator 36 and the first end cell component plate 16. A second thermal insulator 38 may also be secured adjacent the second current collector 26 and positioned so that the second current collector 26 is secured between the second thermal insulator 38 and the second end cell component plate 20. The thermal insulators 36, 38 restrict movement of heat from reaction portion 14 of the fuel cell stack 10 through the first and second current collectors 24 26. The thermal insulators may consist of a rigid insulation that will withstand the compressive forces within a fuel cell which are typically 50–100 pounds per square inch. An exemplary rigid insulation is available under the trade name of "ZAL-45 alumina insulation" manufactured by Zircar Ceramics, Inc., located in Florida, NY, U.S.A.

In an alternative embodiment, the current collector 24 may also include a thin, conductive metal layer 39 secured to the electrically conductive graphite material layer current collector 24 so that the graphite material layer current collector 24 is secured adjacent the first end cell component plate 16. The thin, conductive metal layer 39 could be any highly conductive metal, such as copper, that would normally be deleterious to the fuel cell stack 10, but in the present invention the metal layer 39 would be benign because it is isolated from the fuel cell component plates 12 by the electrically conductive graphite material layer 24. Because the metal layer 39 is highly conductive, it may be substantially thinner than prior art steel end plates. For example, an exemplary conductive metal layer 39 may be less than 2 mm thick, and consequently, the metal layer 39 will have a much lower thermal mass than a prior prior art 20 mm thick steel plate.

A first pressure plate 40 is secured adjacent the first thermal insulator 36, and a second pressure plate 42 is secured adjacent the second thermal insulator 38. The first and second pressure plates 40, 42 are dimensioned to have a cross-sectional area at least as large as a cross-sectional area of the end cell component plate 16, 20 to which they are nearest. For purposes herein, the cross-sectional area of a pressure plate 40, 42 being at least as large as a cross-sectional area of an end cell component plate 16, 20 to which the pressure plate 40, 42 is nearest will be referred to as the first pressure plate 40 overlying the first end cell component plate 16, or as the second pressure plate 20 overlying the second end cell component plate 20. The first and second pressure plates 40, 42 are made of an electrically non-conductive, non-metallic, fiber reinforced composite material. Exemplary materials for making the pressure plates 40, 42 include a glass or fiber reinforced polymer or resin that is compatible with the operating conditions of the fuel cell stack 10. Exemplary fiber reinforced composite materials include products available from the Quantum Composites, Company, of Bay City Mich., U.S.A., distributed under the following trade designations: a. "LYTEX 9063", 63% glass fiber epoxy SMC; b. "LYTEX 4149", 55% carbon fiber epoxy SMC; c. "QC8560" glass fiber reinforced vinyl ester resin SMC; and, d. "QC8880" glass fiber reinforced vinyl ester resin SMC.

In an alternative embodiment, the fuel cell stack 10 may include only the first and second current collectors 24, 26, with the first and second pressure plates 40, 42 secured directly to the current collectors 24, 26, without the thermal insulators 36, 38 secured between the current collectors 24, 26 and pressure plates 40, 42. Additionally, as shown in FIG. 1, the first and second conductive studs 28, 30 may be dimensioned to pass through the first thermal insulator 36 and the first pressure plate 40, and the third and fourth conductive studs 32, 34 may be similarly dimensioned to pass directly through the second thermal insulator 38 and the second pressure plate 42.

The fuel cell stack 10 may also include a first reactant manifold 44 and a second reactant manifold 46 secured to the reaction portion 14 of the fuel cell stack 10 for directing reactant streams, such as reducing fluid and process oxidant streams into the reaction portion 14 of the fuel cell stack 10, and for directing product streams out of the fuel cell stack 10, as is well known in the art. Additionally, the first pressure plate 40 may define a first coolant header 48 for directing a coolant stream into the reactant portion 14 of the fuel cell stack 10 through passages that are not shown in FIG. 1. The first pressure plate 40 may also include a first alignment strut 50 and a second alignment strut 52 for assisting in alignment and assembly of the fuel cell stack 10. Similarly, the second pressure plate 42 may also define a second coolant header 54, a third alignment strut 56, and a fourth alignment strut 58. The first pressure plate 40, may also include a first gas seal 57 dimensioned as a traditional "o-ring" peripheral, compressible seal that extends between the pressure plate 40 and the first end cell component plate 16 to stop passage of any fluids through the seal 57, such as to prevent mixing of reducing fluid and oxidant or air reactants. Similarly, the second pressure plate 42 may include a second gas seal 59 dimensioned to extend between a periphery of the pressure plate and the second end cell component plate 20.

Shown in FIGS. 2–5 is an exemplary improved current collector 60 and an improved pressure plate 62 dimensioned so that the current collector 60 fits within the pressure plate 62. The current collector 60 includes a first conductive stud 64 and a second conductive stud 66 extending away from a first surface 68 of the current collector 60. Additionally, a first coolant header cut-out 70 and a second coolant header cut-out 72 are defined at opposed corners of the exemplary current collector 60. The exemplary pressure plate 62 shown in FIGS. 2–5 includes a first coolant header 74 and a second coolant header 76 at opposed corners of the pressure plate 62 for directing a flow of a cooling fluid through the headers 74, 76 and fuel cell stack 10 as is known in the art. Also included are a first conductive stud opening 78 and a second conductive stud opening 80 defined within a central portion of the pressure plate 62; a first alignment and mounting strut 82 and a second alignment and mounting strut 84 at opposed sides of the plate 62, both of which define throughbores for assisting in use of alignment rods (not shown) that would be utilized during assembly of a fuel cell stack to assist in alignment of the fuel cell component plates. The first and second alignment and mounting struts 82, 84 may also be used to support the fuel cell stack 10 during operation. The exemplary pressure plate 62 also includes a first tie rod protrusion 86, a second tie rod protrusion 88, a third tie rod protrusion 90, and a fourth tie rod protrusion 92, all of which protrusions define throughbores dimensioned to receive separate tie rods (not shown) that would also pass through a second pressure plate (e.g, reference no. 42 in FIG. 1) to cooperate in applying a compressive force to the fuel cell stack, as is well known in the art. The insulating nature of the composite pressure plate 62 permits removal of a dielectric isolating system (not shown) from a load follow-up system (not shown). In the exemplary preferred embodiment of the pressure plate 62, the pressure plate 62 is also shown with a plurality of structural ribs 94 that provide structural strength to the pressure plate 62. The pressure plate 62 could also be fabricated without structural ribs 94, but would in such a case have to be substantially thicker to provide comparable strength characteristics.

Figure 3:
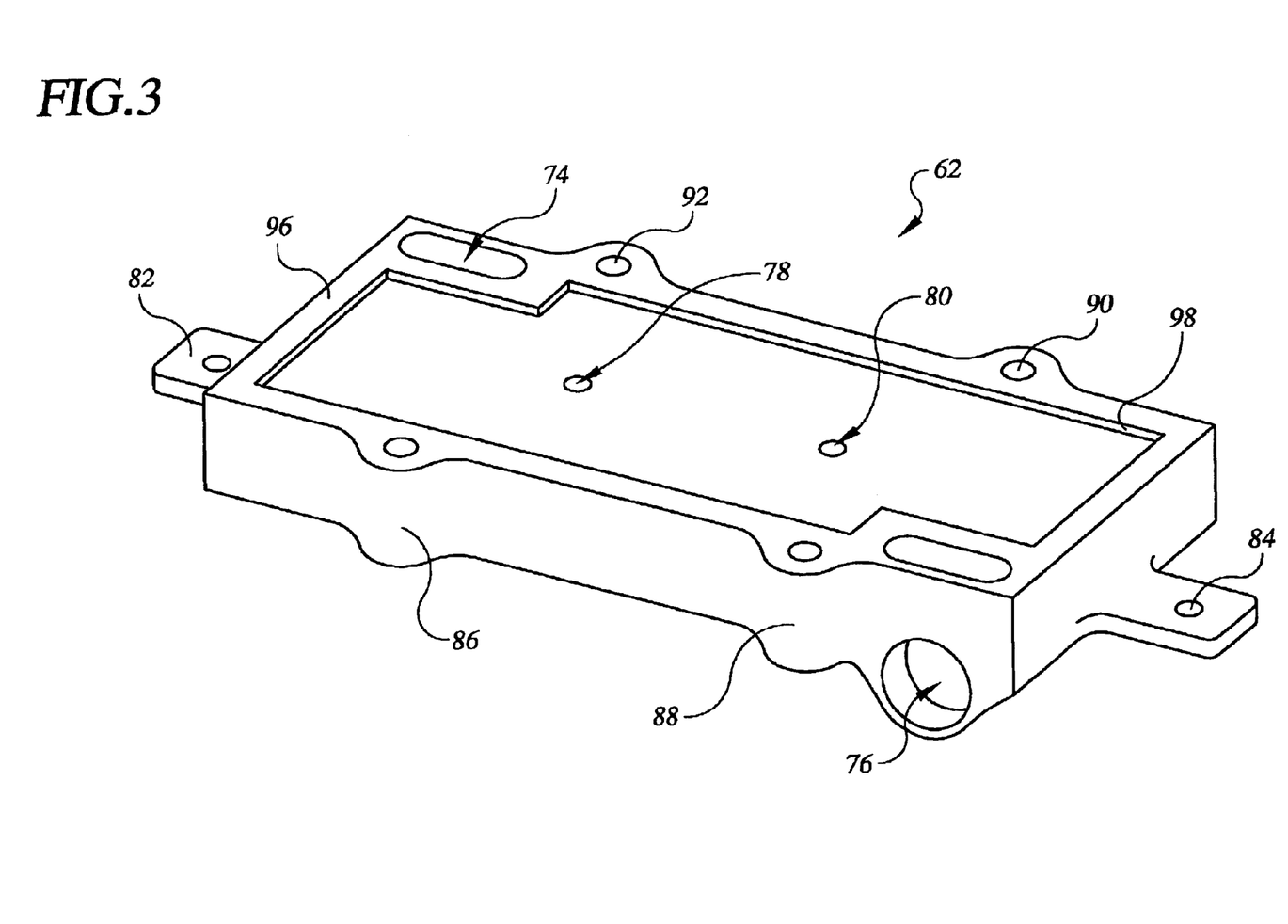
FIG. 3 is a bottom perspective view of the FIG. 2 exemplary improved pressure plate.
Figure 4:
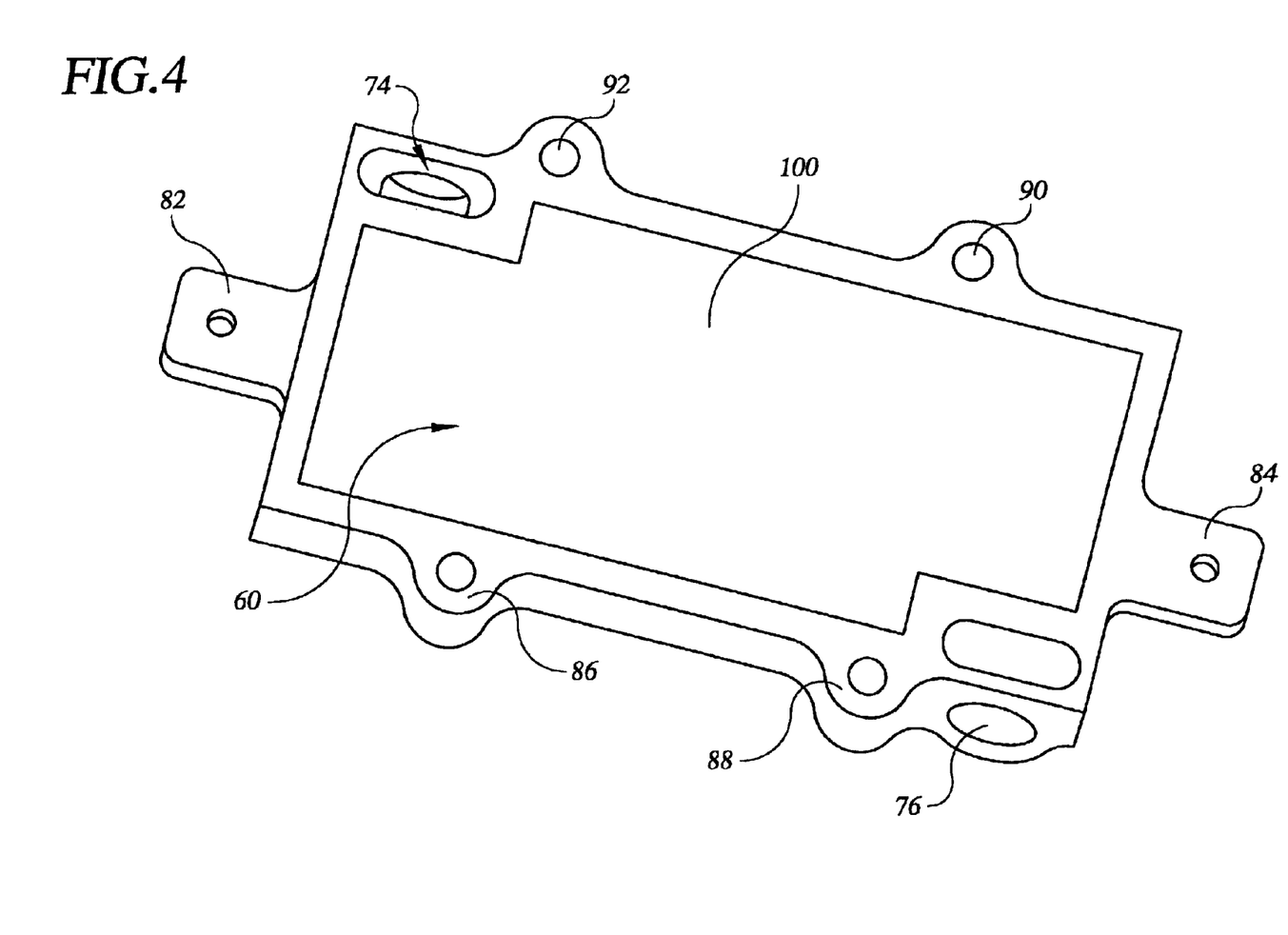
FIG. 4 is a bottom perspective view of the FIG. 2 exemplary improved pressure plate showing the FIG. 2 current collector positioned within the pressure plate.

FIG. 3 shows the exemplary pressure plate 62 rolled toward the viewer showing a bottom surface 96 of the pressure plate 62. The bottom surface 96 includes a cavity 98 defined within the bottom surface 96 that is dimensioned to receive the exemplary current collector 60 so that a bottom surface 100 of the current collector 62 (shown in FIG. 4) is flush with the bottom surface 96 of the pressure plate 62. A preferred embodiment is shown in FIG. 4, wherein the bottom surface 100 of the current collector 60 and the bottom surface 96 of the pressure plate 62 define approximately the same plane. For purposes herein, such an embodiment will be referred to as the current collector 60 being "flush mounted" within a cavity 98 defined within the pressure plate 62. By being flush mounted, the current collector 60 and pressure plate 62 cooperate to facilitate sealing of the end cell component plates 16, 20 to the current collector 60 and pressure plate. Such flush mounting includes a slight protrusion of the current collector 60 from the pressure plate 62, for example by about 0.050 inches, if the pressure plate 62 were to include a compressible gas seal (such as the gas seal 57 shown in FIG. 1), in order to provide a stand off for any seal compression.

Figure 5:
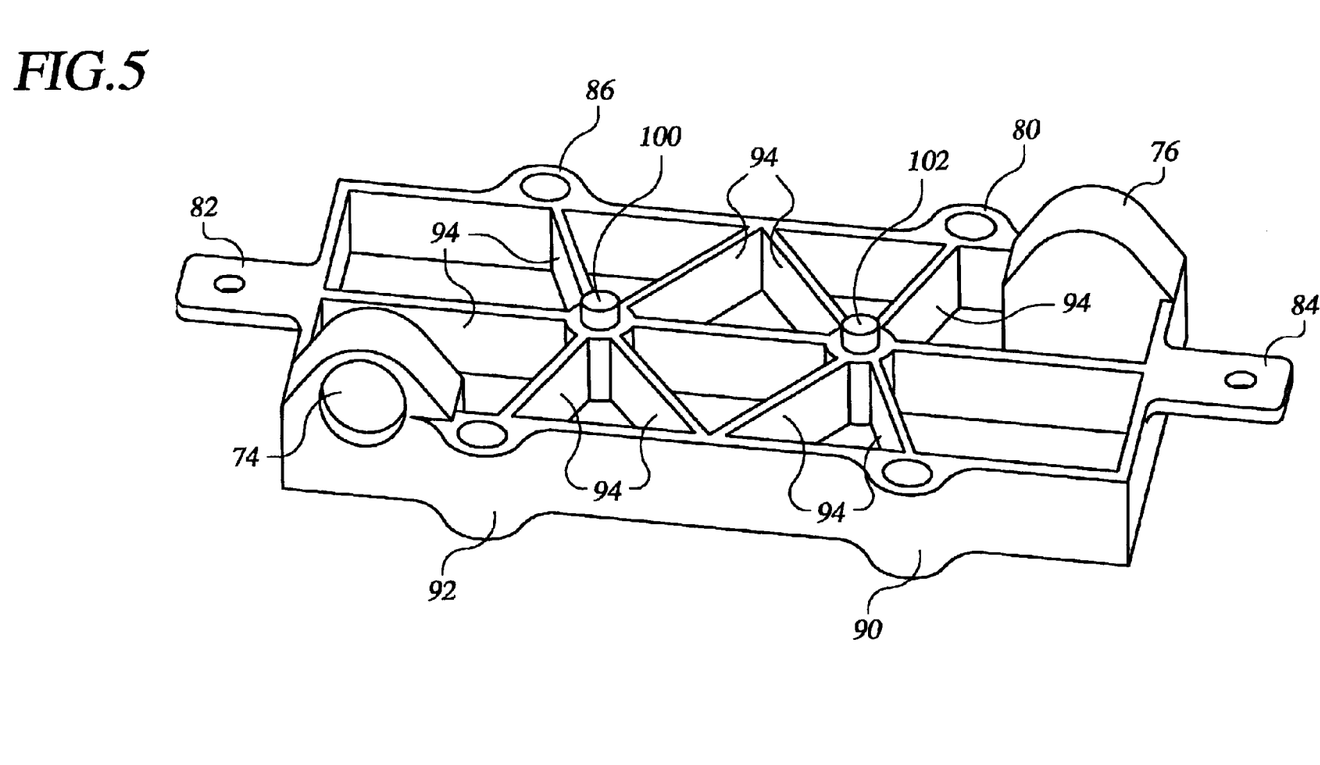
FIG. 5 is a top perspective view of the FIG. 2 exemplary improved pressure plate showing conductive studs of the FIG. 2 current collector passing through openings defined within the FIG. 2 pressure plate.

FIG. 4 shows a bottom perspective view of the current collector 60 flush mounted within cavity 98 in the bottom surface 96 of the pressure plate 62. FIG. 5 shows a top perspective view of the current collector 60 mounted within the pressure plate 62, wherein a contact tip 100 of the first conductive stud 64 has passed through the first conductive stud opening 78, and a contact tip 102 of the second conductive stud 66 of the current collector 60 has also passed through the second conductive stud opening 80 defined within the pressure plate 62. Because the conductive studs 64, 66 are dimensioned to extend above the pressure plate 62, the contact tips 100, 102 of the conductive studs 64, 66 may be readily secured to electrical cables (not shown) to conduct the current generated by the fuel cell stack to an electrical load.

It can be seen that because the exemplary current collector 60 is made of a dense, light, electrically conductive, non-porous graphite, and the exemplary pressure plate 62 is made of a light, strong, electrically non-conductive, non-metallic, fiber reinforced composite material, the improved current collector 60 and pressure plate 62 will substantially reduce the weight, volume and thermal capacity of a fuel cell stack 10. Additionally, because the pressure plate 62 is electrically non-conductive, the fuel cell stack utilizing the pressure plate is safer because an electrically conductive plate is not exposed to the environment surrounding the fuel cell stack. Also, because the pressure plate 62 is electrically non-conductive, there is no need to insulate tie rods, or other components contacting the plate 62. If a thermal insulator 36, 38 is utilized as well between the current collector 60 and pressure plate 62, the fuel cell stack will further reduce any thermal lag or thermal energy loss during a start-up of the fuel cell stack during cold ambient conditions.

While the present invention has been described and illustrated with respect to particular embodiments of a fuel cell stack having improved current collectors and pressure plates, it is to be understood that the present invention is not to be limited to the described and illustrated embodiments. For example the relative dimensions of the current collector and pressure plate may vary substantially depending upon dimensions of varying fuel cell component plates and related flow paths of reactant and product fluids and cooling fluids within a particular fuel cell stack. Additionally, the first and second peripheral, compressible gas seals 57, 59 may be replaced by a perimeter bonding of the pressure plates to the end cell component plates, or by any other mechanism known in the art to restrict mixing of fluids. Accordingly, reference should be made primarily to the following claims rather than the foregoing description to determine the scope of the invention.

What is claimed is:

1. A fuel cell stack for producing electricity from reducing fluid and process oxidant reactant streams, comprising:

a. a plurality of fuel cell component plates stacked adjacent each other to form a reaction portion of the fuel cell stack, the plurality of fuel cell component plates including a first end cell component plate at a first end of the stack of fuel cell component plates, and a second end cell component plate at an opposed second end of the stack of fuel cell component plates:

b. a current collector secured adjacent to an end cell component plate, wherein the current collector is made from non-porous, electrically conductive graphite material, and wherein the current collector includes at least one conductive stud secured to the collector and extending away from the current collector in a direction away from the end cell component plate; and, c. a first pressure plate secured adjacent the current collector and overlying the end cell component plate, wherein the first pressure plate is made of an electrically non-conductive, non-metallic, fiber reinforced composite material, and wherein the first pressure plate defines a plurality of tie rod protrusions, each tie rod protrusion defining a throughbore dimensioned to receive a tie rod that passes through a second pressure plate to apply a compressive force to the fuel cell stack of between 50 and 100 pounds per square inch.

2. The fuel cell stack of claim 1, further comprising a thermal insulator secured between the current collector and the first pressure plate.

3. The fuel cell stack of claim 1, wherein the current collector has a conductivity equal to or greater than 25 siemens per centimeter.

4. The fuel cell stack of claim 1, wherein the first pressure plate includes a gas seal extending between a periphery of the pressure plate to the end cell component plate.

5. The fuel cell stack of claim 1, further comprising a plurality of conductive studs secured to the current collector, wherein the plurality of conductive studs extend through the first pressure plate.

6. The fuel cell stack of claim 1, wherein the current collector is dimensioned to fit within a cavity defined within the first pressure plate so that the current collector is flush mounted within the cavity of the pressure plate.

7. The fuel cell stack of claim 1, wherein the current collector includes a metal layer secured to a layer of electrically conductive graphite material, the current collector being secured so that the metal layer is positioned between the layer of the electrically conductive graphite material and the electrically non-conductive, non-metallic, fiber reinforced first pressure plate.

8. The fuel cell stack of claim 1, wherein the first pressure plate defines at least one coolant header integral with the pressure plate for directing flow of a cooling fluid through the pressure plate and into the fuel cell stack.

9. A fuel cell stack for producing electricity from reducing fluid and process oxidant reactant streams, comprising:
   a. a plurality of fuel cell component plates stacked adjacent each other to form a reaction portion of the fuel cell stack, the plurality of fuel cell component plates including a first end cell component plate at a first end of the stack of fuel cell component plates, and a second end cell component plate at an opposed second end of the stack of fuel cell component plates:
   b. a first current collector secured adjacent the first end cell component plate, and a second current collector secured adjacent the second end cell component plate, wherein the first and second current collectors are made from non-porous, electrically conductive graphite material, and wherein the first current collector includes at least one conductive stud secured to the first current collector and extending away from the first current collector in a direction away from the first end cell component plate and the second current collector includes at least one conductive stud secured to the second current collector and extending away from the second current collector in a direction away from the second end cell component plate; and,
   c. a first pressure plate secured adjacent the first current collector and overlying the first end cell component plate, and a second pressure plate secured adjacent the second current collector and overlying the second end cell component plate, wherein the first and second pressure plates are made of an electrically non-conductive, non-metallic, fiber reinforced composite material, and wherein the first and second pressure plates each define a plurality of tie rod protrusions, each tie rod protrusion defining a throughbore dimensioned to receive a tie rod that passes between the throughbores of the first and second pressure plates to apply a compressive force to the fuel cell stack of between 50 and 100 pounds per square inch.

10. The fuel cell stack of claim 9, wherein the fuel cell stack further comprises a first thermal insulator secured between the first current collector and the first pressure plate, and a second thermal insulator secured between the second current collector and the second pressure plate.

11. The fuel cell stack of claim 9, wherein the first and second current collectors each have a conductivity equal to or greater than 25 siemens per centimeter, the first pressure plate includes a first gas seal extending between a periphery of the first pressure plate to the first end cell component plate, and the second pressure plate includes a second gas seal extending between a periphery of the second pressure plate to the second end cell component plate.

12. The fuel cell stack of claim 9, wherein the first current collector is dimensioned to fit within a cavity defined within the first pressure plate so that the first current collector is flush mounted within the cavity of the first pressure plate, and the second current collector is dimensioned to fit within a cavity defined within the second pressure plate so that the second current collector is flush mounted within the cavity of the second pressure plate.

13. The fuel cell stack of claim 9, wherein the first pressure plate defines at least one coolant header integral with the first pressure plate for directing flow of a cooling fluid through the pressure plate and through the fuel cell stack, and the second pressure plate defines at least one coolant header integral with the second pressure plate for directing flow of the cooling fluid through the second pressure plate and through the fuel cell stack.

* * * * *